United States Patent Office 2,853,762
Patented Sept. 30, 1958

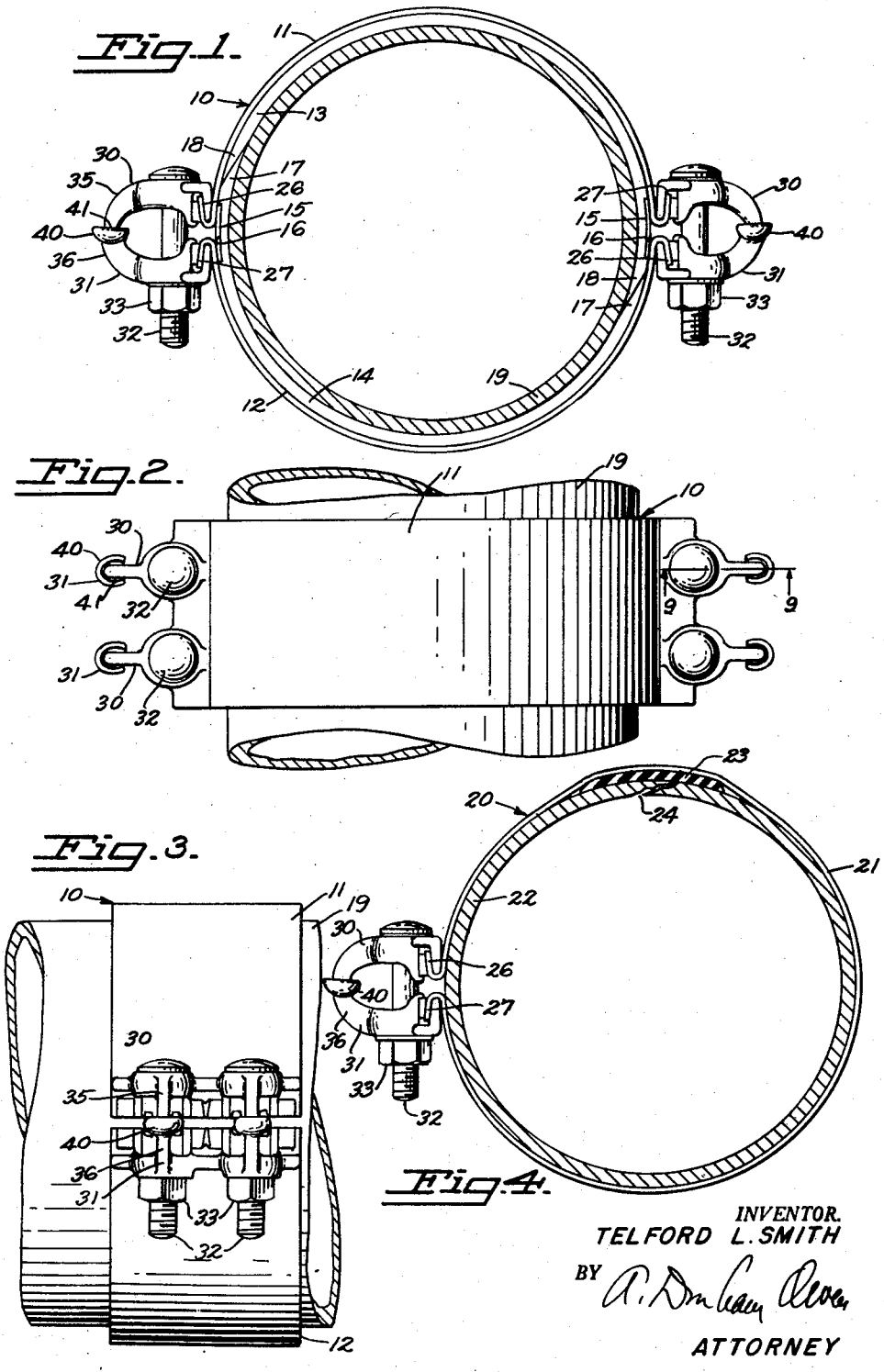

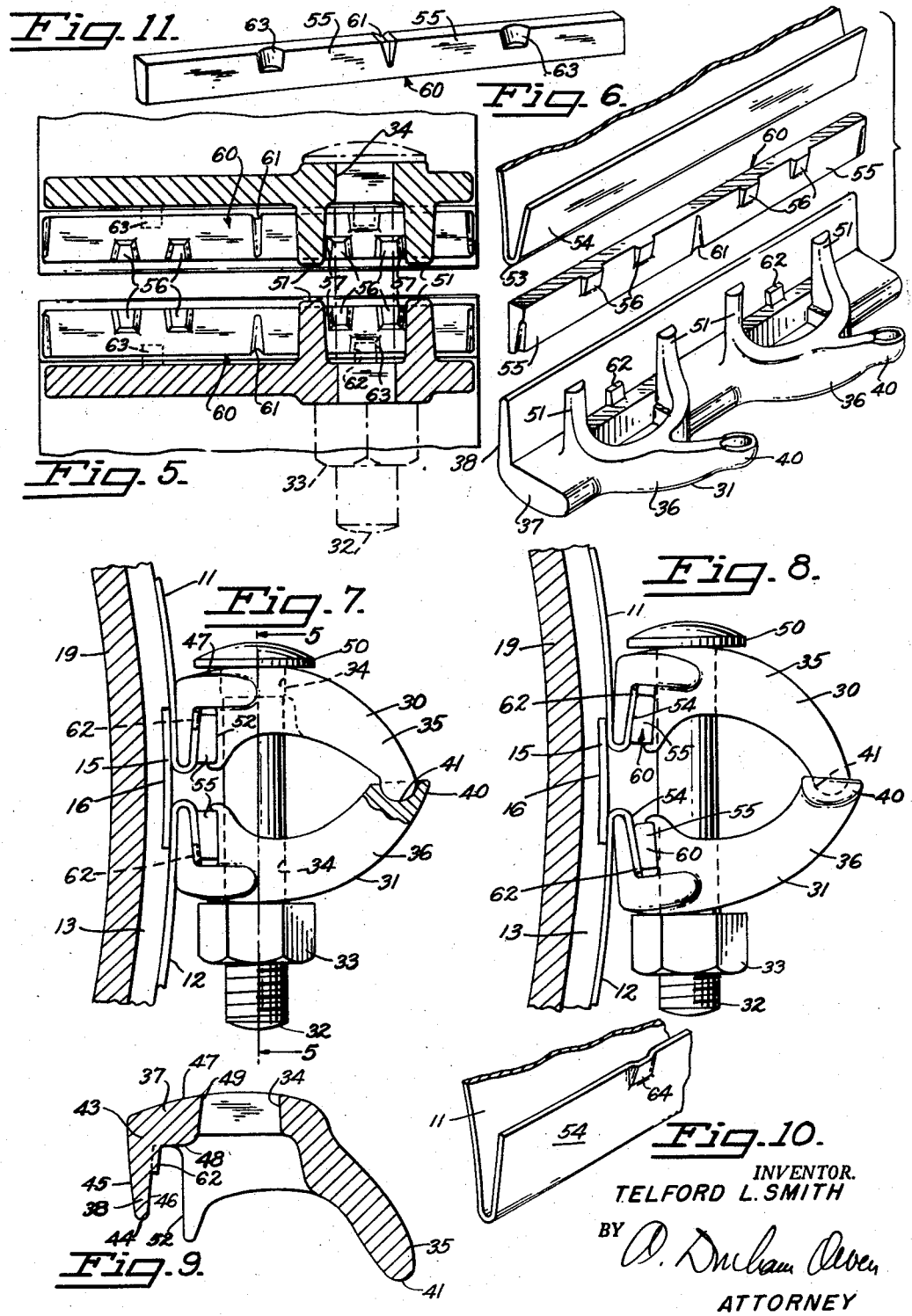

2,853,762

PIPE CLAMP OR COUPLING AND LUG UNITS THEREFOR

Telford L. Smith, South San Francisco, Calif.

Application February 7, 1957, Serial No. 638,764

7 Claims. (Cl. 24—279)

This invention relates to improvements in pipe repair clamps and pipe couplings of the type in which malleable or flexible metal bands are wrapped around the pipe like a sleeve, fitted at the ends with clamping lugs, and clamped tightly in place by bolts that pass through the lugs.

The flexible metal band type of pipe repair clamp has been widely adopted because of its low cost, light weight, and because its flexibility enables it to equalize the pressure on the gasket and on the pipe. It is adaptable to many conditions; it can be made up in the field by cutting a strip of copper or stainless steel from a stock roll and then providing the strip ends with lugs and bolts. In a typical prior-art installation, a single copper strip was held together around the pipe by a single pair of lugs attached to the ends of the strip and connected together by bolts. The gasket, which may also be cut from stock material, was used only over the actual break in the pipe. With this type of clamp, practically any size of pipe can be accommodated by cutting the flexible metal bands and gaskets to size from stock strips without having to keep a variety of sizes of castings on hand, and one type of lug can be used, whatever the size.

The present invention is an improvement on the pipe clamp or coupling shown in the application Serial No. 417,588 filed March 22, 1954. That device utilizes a novel form of lug with a pivoting action which enables the bolts to float freely during all positions of tightening, thus eliminating possible bending of these bolts due to imposition of large forces normal to their longitudinal axis. This pivoting action also made it possible to use large bolt openings that prevented any binding action between the lugs and the bolts. The novel pivot structure resulted in the proper alignment of the bolts and lugs and in the maintenance of that alignment at all times. The bolts float freely in the lugs, and the band is always pressed tightly around the pipe and the gasket. The lugs and bolts are tangent to the pipe and the band bears closely. That invention also incorporated a wedge member for anchoring the lugs to the ends of the malleable bands, and the present invention relates principally to an improvement in this anchoring structure, including the wedge. The wedge means is preferably made up in long strips providing a series of successive wedges correctly spaced and joined together at weakened places where they can be broken so that at the time of installation the correct number of wedges can be broken off as a strip.

In the present invention, the wedges are provided with a locking portion that cooperates with a corresponding locking portion on the lugs to lock the flexible metal band between the lugs and the wedge and prevent its slippage, thus permitting higher band tensions to be developed, increasing the pressure-holding capability of the device. This structure gives increased economy by reducing the cost of manufacturing the wedges, by reducing the time it takes to place the wedges in the lugs, and by making it easier to handle the required parts. It also makes it easier to store and to transport the wedges.

The invention also gives the lugs and wedges a much firmer hold on the malleable band and prevents it from coming loose.

One object, therefore, of the invention is to provide an improved wedge structure for a malleable-band or flexible metal band type of clamp.

Another object of the invention is to provide interlock means between the wedge, the lug, and the malleable band to prevent the malleable band from slipping out from between the wedges and lugs in an installed pipe clamp.

Another object of the invention is to add greatly to the economies and efficiency of clamps employing flexible metal bands.

Other objects and advantages of the invention will appear from the following description of the preferred embodiment thereof given in accordance with 35 U. S. C. 112.

In the drawings:

Fig. 1 is a view in end elevation of a clamp-coupling embodying the present invention, shown installed around a pipe, the pipe being illustrated in section. The clamp-coupling here illustrated includes two flexible metal strips and two pairs of lugs.

Fig. 2 is a top plan view of the clamp-coupling of Fig. 1, with the ends of the pipe broken off to conserve space.

Fig. 3 is a view in side elevation of the clamp-coupling of Fig. 1, with the ends of the pipe broken off.

Fig. 4 is a view in end elevation and in section similar to Fig. 1 of a modified form of pipe repair clamp, also embodying the present invention in which one strip encircles the pipe and only one pair of lugs is used.

Fig. 5 is a view in elevation and in section taken along the line 5—5 in Fig. 7 and shown on an enlarged scale.

Fig. 6 is an exploded view in perspective of a lug, a wedge unit and an end portion of the malleable band before assembly.

Fig. 7 is an enlarged view partly in section of a portion of Fig. 1 showing the position of the right-hand lugs at the end of the tightening operation.

Fig. 8 is a view somewhat similar to Fig. 7 but showing the lugs at the beginning of the tightening operation.

Fig. 9 is a view in section through one lug taken along the line 9—9 in Fig. 2 with the bolt, wedge, and malleable band all removed.

Fig. 10 is a fragmentary enlarged view in perspective of a portion of the malleable band after it has been removed from a clamp, showing the depression made by the locking means on the lug and the wedge.

Fig. 11 is a view in perspective of a portion of a wedge block, shown from the rear and upside down as compared with the showing in Fig. 6.

Two forms of the invention are shown. The clamp-coupling 10 shown in Figs. 1 to 3 incorporates two semi-circular flexible metal bands 11, 12, each of which has one gasket 13 or 14, lying against its inner surface and adapted to mate with the other gasket 14 or 13. A strip 15 of flexible metal is embedded in a recess 16 in each gasket 13, 14 and prevents damage to its gasket during the clamp-tightening operation. The gaskets 13, 14 have tapered ends 17, 18, which mate, so that when the clamp coupling 10 is assembled there is in effect a unitary gasket sealing around the whole circumference of the pipe or pipes 19. In this form of the invention, the bands 11, 12 are normally pre-shaped at the factory and the gaskets 13, 14 cemented to the bands 11, 12, the wear strips 15 already being bonded to the gaskets in the appropriate recesses 16.

The pipe repair clamp 20 shown in Fig. 4 is normally made up in the field by cutting a strip 21 of malleable metal to a desired length, somewhat longer than the circumference of the pipe 22, so that it completely or substantially completely encircles the pipe 22 and its ends still have enough room to be turned up to be grasped by the lugs. The strip 21 is bent into shape on the spot, and a small gasket 23 is normally cut out from stock sheet rubber to the desired size, which should be long enough to cover the break 24 in the pipe 22, but is not normally enough to encircle the pipe 22, though that may be done if desired. Both the sheet rubber and the malleable metal normally come in large rolls of strip material.

No matter which form of the invention is used, the clamp-coupling 10 or the clamp 20, the band ends 26, 27 are held together by a pair of lugs 30, 31, each pair being like every other pair, and by bolts 32 and nuts 33. The bolts 32 pass through openings 34 (see Figs. 7 and 9) in the lugs 30, 31, which may be made from bronze, iron, steel, or other suitable metal. These lugs may be adapted to take any number of bolts 32 from one up, depending on the length of the portion of pipe 19 or 22 to be clamped around. In the drawing, two bolt openings 34 are shown in each lug by way of example, but not as limitation. The lug units may be made in series to have any number of bolts desired.

The lugs 30, 31 both have curved claws or fingers 35, 36 extending out from a body portion 37, and a depending tangential flange 38 adjacent the ends 26, 27 of the malleable strip. The claws 35, 36 are identical except at their outer ends. The fingers 36 of the lower lug 31 terminate in a concave or swivel socket 40, while the fingers 35 of the upper lug 30 terminate in a convex rounded ball-like tip 41 that can pivot rotatably in the socket 40 when the lugs 30, 31 are assembled together. The important rotative pivot action obtained by this connection and shown somewhat by Figs. 7 and 8 is very important, and is described and claimed fully in the application heretofore referred to, Serial No. 417,588. When the nuts 33 are tightened on the bolts 32, the lugs 30, 31 rotate relative to each other against the ball 41-socket 40 combination, and the rotative force acts against the tendency of the bolts 32 to bend; so it keeps them perfectly straight at all times. Also, this rotation causes the tangential flange 38 of each lug 30, 31 to move in against the bands 11, 12 or the band 21 and force the bands radially toward the pipe wall, so that the very point where the tightening of the bolts 32 would not of itself exert pressure on the band is tightened directly by this rotation of the lugs.

The tangential flange 38 of the lugs 30, 31 is generally rectangular or trapezoidal as seen in elevation with its thickness tapered slightly on both sides. The widest part of the flange 38 is its inboard end 43 (see Fig. 9), where it joins the body 37, and its narrowest part is at the outboard end 44. The sloping of the inner face 45, the one that lies closest to the pipe, increases the effective bearing surface of the lugs 30, 31 against the band so that when they are forced in radially toward the pipe by the pivoting of the fingers 35, 36, the flange face 45 bears against a substantial area of the band 11, 12 or 21 instead of having just a point in line contact at the outboard end 44. The sloping of the outer face 46 or the tangential flange 38 is complementary to the wedge structure that will be discussed in a moment.

The bolt opening 34 through the lug 30 is smaller near the body's outer face 47 than on the inner side 48. The smaller portion 49 of the opening 34 may be square or other polygonal shape to accommodate and key the shank of the carriage bolt 32, and the remainder of the opening 34 is preferably enlarged to prevent any binding of the bolts as the lugs rotate. The outer face 47 of the body of each lug 30, 31 is preferably curved convexly, and this structure aids in holding the bolts 32 in a straight position and not exerting bending pressures upon them. Preferably the lugs are so constructed that the bolt head 50 will rest on the high point of the curved surface 47 when the bolts are fully tightened.

In prior art devices, the malleable band was usually crimped into milled slots in the lugs. In my preceding invention, however, Serial No. 417,588, there was no milled slot, but instead the lug body 37 was provided with depending detents or teeth 51 spaced at a substantially constant distance from the outer face 46 of the tangential flange 38, one tooth 51 being located on each side of each bolt opening 34 and, therefore, one on each side of each finger 35 or 36. The inner face 52 of each tooth 51 slopes slightly so that the distance between the surfaces 46 and 52 is greatest at the open end and smallest at the closed end and is smoothly tapered in between. These parts can, therefore, be formed by casting and no milling is necessary or desirable.

When the ends 26, 27 of the bands 11, 12 or 21 are shaped as shown in Figs. 6 and 7, with a short bent-out radial portion 53 and a bent back, generally tangential portion 54, the portion 54 can be made to lie in between the outer face 46 of the generally tangential flange 38 and the faces 52 of the teeth 51. The outboard end 44 of the tangential flanges 38 abuts the radial portion 53, and the inner face 45 abuts the outer face of the band, so that the tangential flange 38 is surrounded and contacted on three sides by the band 11, 12 or 21.

In the prior art, the holding of the band was completed by inserting a series of wedges 55 to hold the band tightly against the tangential flange 38, one wedge being used for each bolt opening 34 and for each claw 35 or 36. These wedges 55 resemble closely what is shown in the drawing, being a slightly tapered block of bronze or other strong metal provided with a pair of guide tits 56 that are adapted to space the wedge 55 in exact longitudinal relation with respect to the teeth 51 by contacting the radial edges 57 of the teeth 51 closest to the bolt opening (see Fig. 5). With the band held in its proper position relative to the lug's tangential flange 38, the wedges 55 are driven in with a hammer or other means, wedging the band ends 26 or 27 and the lug 30 or 31 firmly together. Preferably, the wedges 55 are made a unitary block 60 of successive wedges 55, all joined together or, in other words, a long strip 60 provided with a thinned or weakened portion 61, which is easily split apart by a chisel or broken by simply banging the block down on a sharp, solid edge as on one of the lugs. In this manner, the desired number of wedges 55 can be broken off from the strip stock 60 and then the entire group of wedges can be dropped into place as a unit. Accurate spacing is achieved instantaneously, and with no problem whatever.

Sometimes, in the past, however, the band tended to slip out from between the wedge 55 and flange 38, especially if it was not driven tightly enough, or the malleable metal was hard such as stainless steel. In the present invention, I provide a considerable improvement over this structure, enabling more rapid assembly of the clamp, together with a surer holding of the clamped malleable member.

I provide a projecting detent 62 (see Figs. 5 and 6) in the flange 38 adjacent its closed end and centered substantially centrally with respect to the bolt opening 34; i. e., substantially opposite and in line with its finger 35 or 36. To cooperate with this detent, I provide a recess 63 in each wedge 55 somewhat greater in size and preferably smoothly cut on a curve. Since the teeth 51 and tits 56 provide exact alignment of the wedges 55, there is no problem of aligning the detent 62 with the recess 63. Now when the wedge 55 is driven in by hammer or other means, prior to tightening the lugs together (see Fig. 8), the malleable band 11, 12 or 21 is clamped between the wedge recess 63 and the lug detent 62, deforming it, with the result that a detent-like portion 64 (Fig. 10) is formed by curving the wall outwardly at that point. As a result of this, there is no possibility of lengthwise slipping of the malleable member once it is installed, and at the same time the driving of the wedge into it and the effect of the detent-recess combination is to form a very tight clamp preventing any withdrawal of the band from between the wedge and the lug. Furthermore, the ends of the teeth 51 are upset over the wedges, by hammer or otherwise, so that there is no chance for the wedges to come out.

It will thus be recognized that I have improved my former invention by providing for quicker assembly of the clamp and for a greater sureness in retaining the malleable band in place.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a clamp for pipe and the like, at least one flexible metal band with its opposite ends bent back, a pair of lugs for each band, each adapted to engage one said bent-back end and conform said band around said pipe, and a bolt extending between each adjacent pair of asid lugs, each lug having a gripping portion which extends substantially parallel to the longitudinal axis of said bolt to engage said bent-back band at points radially and axially spaced from said bolt, and a wedge-engaging portion spaced between said bolt and said gripping portion; and a wedge between said wedge-engaging portion and said bent-back end forcing said bent-back end into tight engagement with said gripping portion, said gripping portion and said wedge having generally matching projections and recesses between which portions of said bent-back ends are sandwiched and deformed.

2. In a pipe clamp of the type employing one or more strips of malleable metal wrapped around the pipe and having bent end portions and pairs of mating lugs for securing adjacent meeting ends of said malleable metal strips, each said lug having a main body portion with at least one bolt opening therethrough, the improvement wherein each said lug has a flange projecting from said main body portion, and generally tangential to the adjacent portion of said strip which is wrapped around the pipe, the end of said strip being bent therearound, and wedge-holding means spaced from said flange, and wedge means between said wedge-holding means and said flange sandwiching said strip end between it and said flange, said flange and said wedge means having corresponding projecting portions and recessed portions between which the sandwiched strip end is deformed for tighter seizure.

3. In a clamp for tightening a flexible band having bent-back spaced-apart ends about an object, and a plurality of lugs each adapted to engage one of said bent-back ends, a bolt extending between each adjacent pair of said lugs, each of said lugs having a gripping portion which extends substantially parallel to the longitudinal axis of said bolt so that it engages one of the bent-back end portions of said band at points radially and axially spaced from said bolt, and a wedge-engaging portion spaced between said bolt and said gripping portion, each of said gripping portions having a surface thereof facing a surface of each of said wedge-engaging portions, each of said gripping portions having a band-engaging projection on said facing surface adjacent its inboard end; and a wedge between each of said wedge-engaging portions and said bent-back end forcing said bent-back end into tight engagement with each of said gripping portions, said wedge having recesses in one surface that faces said gripping portion of each lug, each of said recesses being slightly larger than and generally mating with a corresponding one of said projections, so that when said wedge is driven into place a portion of said bent-back ends is deformed to provide a detent-like portion sandwiched between said lug gripping portion and said wedge, so as to hold said band tightly in place.

4. In a clamp for tightening a flexible band having bent-back spaced-apart end portions about an object, in which a plurality of lugs are each adapted to engage one of said bent-back ends, with a bolt extending between each adjacent pair of said lugs, the improvement comprising a gripping portion which on each lug extends substantially parallel to the longitudinal axis of said bolt so that it engages the bent-back end of said band at points radially and axially spaced from said bolt, the face of said gripping portion nearer said bolt having a plurality of basal projections, and series of spaced wedge-engaging and wedge-locking portions on each lug spaced between said bolt and said gripping portion; and a wedge block driven between said wedge-engaging portion and said bent-back end and having a plurality of recesses, one located opposite each said basal projection, said wedge block forcing said bent-back end into tight engagement with said gripping portion, portions of said bent-back end being formed into detent-like configurations by said projections and recesses, the outer ends of said wedge-engaging and wedge-locking portions being upset over said wedge to lock said wedge firmly in place.

5. In a pipe clamp of the type employing one or more flexible strips of metal wrapped around the pipe, the improvement comprising a pair of mating lugs for securing together adjacent meeting ends of said metal strips, each said lug having a main body portion adapted to extend outward from said pipe and having at least one bolt opening therethrough, a flange extending from the inner side of said main body portion and lying generally tangential to said strip and having projections from said inner side and said flange, and wedge-holding means comprising a plurality of detents depending from said main body portion at a spaced interval from said flange, bolt means for extending through said bolt openings between said pair of lugs, and wedge means adapted to fit in each lug in the space between said flange and said wedge-holding means to clamp an end of said strip between said wedge means and said flange, each said wedge means having a plurality of projections thereon adapted to engage said detents to prevent lengthwise displacement of said wedge, each said wedge means also having recesses adjacent one edge adapted to lie opposite said projections and deform the strip in between said projections and said recesses.

6. In a pipe clamp of the type employing one or more flexible strips of metal wrapped around the pipe, the improvement comprising a pair of mating lugs for securing together adjacent meeting ends of said metal strips, each said lug having a main body portion adapted to extend outward from said pipe and having at least one bolt opening therethrough, a flange extending from one side of said main body portion and lying generally tangential to said strip, projections extending from said one side and said flange, and wedge-holding means comprising a plurality of detents extending from said main body portion at a spaced interval from said flange, bolt means for clamping said lugs together, and wedge means adapted to fit in each lug in the space between said flange and said wedge-holding means to clamp an end of said strip between said wedge means and said flange, each said flange and wedge means having a corresponding plurality of matching projections and recesses thereon adapted to engage said strip between them.

7. In a pipe clamp of the type employing one or more flexible strips of metal wrapped around the pipe and having bent end portions, the improvement comprising a pair of mating lugs for securing adjacent meeting ends of said metal strips, each said lug having a main body portion with at least one bolt opening therethrough, a flange projecting from said main body portion, and generally tangential to the adjacent portion of said strip which is wrapped around the pipe, the bent end portion of said strip being positioned immediately adjacent the point of tangency, said flange having a plurality of projections close to said main body portion, wedge-holding means comprising a pair of teeth projecting from said body portion on opposite sides of said bolt opening adjacent and spaced from said flange, a wedge block for each pair of teeth, having position-locating means thereon that mate with said teeth on said wedge-holding means to positively locate said wedge block lengthwise of said lugs, each said block being adapted to fit in each lug in the space between said flange and said wedge-holding means with the ends of said wedge-holding means upset thereover, each block having recesses adapted to overlie said projections to deform said strip thereinto, and bolt means adapted to extend through the bolt openings and clamp said pair of lugs together.

References Cited in the file of this patent

UNITED STATES PATENTS

| | | |
|---|---|---|
| 732,309 | Marshall | June 30, 1903 |
| 2,599,882 | Adams | June 10, 1952 |